UNITED STATES PATENT OFFICE.

SYDNEY M. TOOTAL, OF BLACKPOOL, ENGLAND.

DYE.

1,289,968.     Specification of Letters Patent.     Patented Dec. 31, 1918.

No Drawing.     Application filed November 20, 1917. Serial No. 202,995.

*To all whom it may concern:*

Be it known that I, SYDNEY MILTON TOOTAL, a British subject, residing at Blackpool, county of Lancaster, England, have invented certain new and useful Improvements in Dyes, of which the following is a specification.

This invention relates to preparations of dyes in which the dye is mixed with or there is incorporated with the dye an organic body capable of being dried or solidified such as glue or gelatin.

The object of the invention is to provide a dye composition or preparation for home dyeing of domestic articles in a form that can be readily handled and used by a person unacquainted with the technicalities of dyeing and consists in preparing a dye composition having in combination an acid dyestuff with a direct or substantive dyestuff and gelatin or glue as a carrier with which both dyestuffs will combine and prevent the separate precipitation of one of the dyes and with a medium to neutralize any acidity in the gelatin such as zinc-oxid, ammonia or sodium carbonate the finished product being in the form of a dry wafer clean to the touch and of a prescribed quantity.

I find say taking an acid dyestuff such as patent blue A and combining along with a known direct or substantive dyestuff such as diamin strong blue A, I have a combination which assisted with the carrier gelatin gives for home dyeing an even shade on cotton wool and silk.

Further with the use of gelatin combinations of three distinct groups of color can be used—such as:

(*a*) Basic—majenta.
(*b*) Direct or substantive—erica—B.
(*c*) Acid—zylene red B.

all in combination thus facilitating the application of the dyestuffs for home use. The gelatin prevents precipitation of one dye from the others in this combination.

In carrying out the invention equal weights of gelatin or glue and water are placed in a suitable vessel and allowed to soak for about 12 hours. The whole is then transferred to a water bath and heated until the gelatin or glue is dissolved. There may then be added to prevent stickiness and to neutralize any acidity in the gelatin or glue—zinc oxid, ammonia or sodium carbonate up to $7\frac{1}{2}\%$ by weight and the mass is again agitated and boiled. From 15% to 20% by weight of a solution of the dyestuffs in water or glycerin up to 50% strength is then added and the mixture again agitated and boiled. The mixture is then run out on to trays or molds of the shape and thickness required and heated or dried at a temperature up to 120° F., the material being molded or cut into wafers of the desired size and shape such as circular, rectangular or lozenge.

What I claim as my invention and desire to protect by Letters Patent is:—

1. A dye composition or preparation for home dyeing of domestic articles comprising a combination of acid and substantive dyes and gelatin in the form of a dry wafer substantially as described.

2. A dye composition or preparation for home dyeing of domestic articles comprising basic, substantive, and acid dyes, gelatin and a neutralizing medium, to neutralize any acidity in the gelatin, in the form of a dry wafer substantially as described.

In testimony whereof I have hereunto set my hand in presence of two subscribing witnesses.

SYDNEY M. TOOTAL.

Witnesses:
J. OWDEN O'BRIEN.
GEORGE H. O'BRIEN.